United States Patent [19]
West

[11] 4,081,101
[45] Mar. 28, 1978

[54] DOUBLE FISHERMAN'S PAIL

[76] Inventor: Louis J. West, Rte. 1, Box 60-A, LaPorte City, Iowa 50651

[21] Appl. No.: 760,724

[22] Filed: Jan. 19, 1977

[51] Int. Cl.² ............... B65D 21/02; A45C 13/00
[52] U.S. Cl. .................. 220/23.4; 220/23.83; 190/52
[58] Field of Search ............ 220/23.4, 23.2, 23.83, 220/23.86, 4 B, 4 E, 20; 190/51, 52, 42

[56] References Cited
U.S. PATENT DOCUMENTS

| 185,372 | 12/1876 | Watts | 190/42 |
| 3,913,711 | 10/1975 | Schmid | 220/23.83 X |

FOREIGN PATENT DOCUMENTS

| 34,900 | 3/1886 | Germany | 190/52 |

*Primary Examiner*—Wiliam Price
*Assistant Examiner*—Steven M. Pollard
*Attorney, Agent, or Firm*—Haven E. Simmons; James C. Nemmers

[57] ABSTRACT

A double pail for fishermen consists of a pair of identical pails, one being inverted and forming a top for the other while sandwiched between the two is a pair of lids, one for each pail. The two pails and lids are conjointly hinged along corresponding edges, the lids forming work surfaces when the pails are unfolded. The hinges and lids can be removed as a unit to detach the pails for separate use.

7 Claims, 4 Drawing Figures

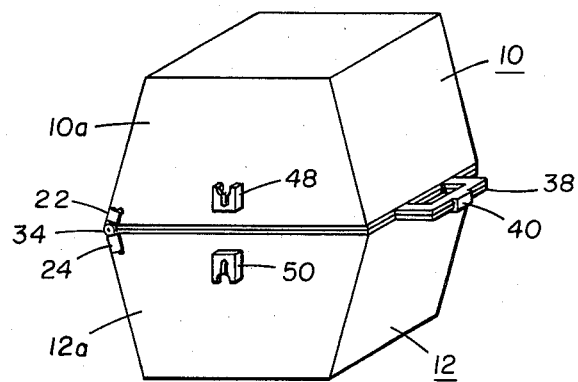
FIG 1
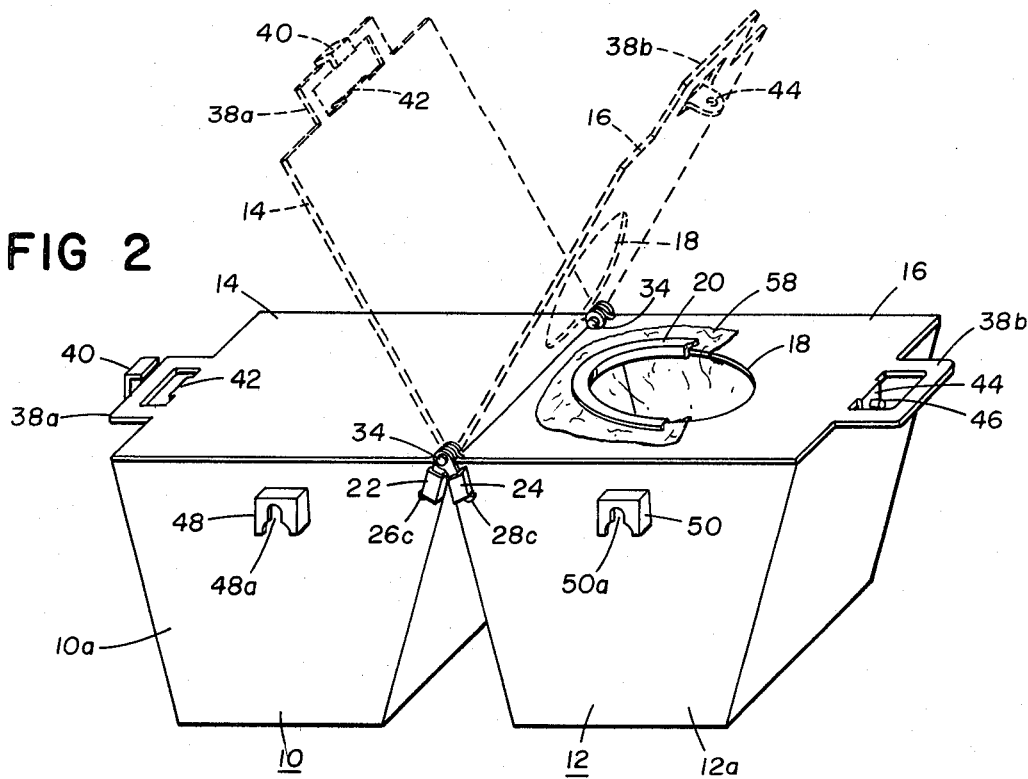
FIG 2
FIG 3
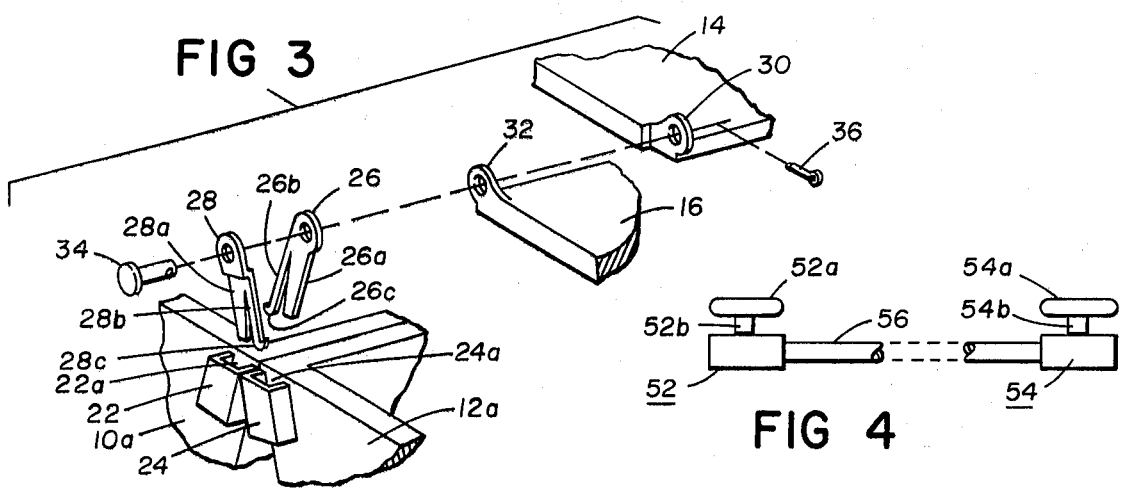
FIG 4

DOUBLE FISHERMAN'S PAIL

BACKGROUND OF THE INVENTION

So far as is known, there is no form of fishermen's pail which really serves much more than as a pail. Yet fishermen customarily carry wtih them a good deal of gear of various kinds, besides that just in their tackle boxes. Then, too, some sort of convenient arrangement is desirable for cleaning fish, especially when that is done in the field or at the campsite. It is the object of the present invention, therefore, to provide a piece of fishermen's apparatus which can serve as a pail, as a bench, as it were, for cleaning fish, as a carry-all for fishing gear, as well as other useful and convenient functions.

SUMMARY OF THE INVENTION

Essentially, the present invention comprises a pair of identical containers or pails, one inverted and folded onto the other to form a top. Each pail is also equipped with a cover or lid, one of which is apertured and fitted with a bag retainer collar. The two pails and lids are hinged about a common axis along their corresponding edges so that the two pails can be unfolded and set upon the ground, whereby the two lids in turn form work surfaces. When a bag is placed in the one pail and secured by the retaining collar so that it opens up through the lid, a dump is thereby provided for the entrails of fish cleaned on the work surfaces. The lids are hinged so that they can be lifted relative to their respective pails for access to the interiors of the latter in which fishing gear can be stored and carried. The hinged arrangement is such that the two lids and the hinges can be detached from the pails so that each of the latter can be used separately, to carry water, for instance. When the pails are folded up, besides being useful to store and carry fishing gear, they can also act as a seat or even as a temporary life preserver.

BRIEF DESCRIPTION OF THE DRAWINGS

FIG. 1 is an isometric view of a double fishermen's pail according to the present invention, the pail being shown in its folded state.

FIG. 2 is similar to FIG. 1 but illustrates the double pail in its unfolded state and the hinging of the two lids.

FIG. 3 is a detail, shown in exploded fashion, of the common hinging arrangement for the two pails and lids and illustrates the manner in which the two pails can be separated for individual use.

FIG. 4 is a truncated side view of a flexible handle with which either pail can be equipped for individual use.

DETAILED DESCRIPTION OF THE PREFERRED EMBODIMENT

The two identical pails 10 and 12 are of square and trapezoidal shape when viewed in plan and elevation, respectively, and may preferably be integrally molded from a suitable plastic. As shown in FIG. 2, the pails 10 and 12 are provided with lids 14 and 16 of fairly rigid material, the lid 16 being provided with a circular opening 18 into which is removably press-fitted a flanged retaining collar 20 which may also be molded from suitable plastic material. Adjacent upper corners of the side walls 10a and 12a of the pails 10 and 12 are integrally molded to provide pairs of hinge leaf anchors 22 and 24 of generally box-shape having upright channels 22a and 24a therethrough which incline towards each other (see FIG. 3). The channels 22a and 24a in turn receive the lower ends of a pair of removable hinge leaves 26 and 28. The lower ends of the latter are vertically Veed to form legs 26a, 26b and 28a, 28b which are resiliently compressible toward each other, the legs 26b and 28b being provided with out-turned retaining ears 26c and 28c at their lower ends. When the legs 26a, 26b and 28a, 28b are compressed, the leaves 26 and 28 can then be slipped down into the channels 22a and 24a, whereupon the legs 26b and 28b will snap out and be retained by the ears 26c and 28c. The upper ends of the leaves 26 and 28, one of which is offset to accommodate the former, overlap and are laterally aligned with a similar pair of overlapping, offset hinge leaves 30 and 32 integrally formed upon the adjacent corners of the lids 14 and 16. The overlapping portions of the hinge leaves 26, 28, 30 and 32 are all apertured to receive a short, headed hinge pin 34 retained by a cotter pin 36, for instance, or other means. It will be understood, of course, that an identical arrangement is provided on the opposite side of the pails 10 and 12 so that the latter and the lids 14 and 16 are all individually hinged relative to each other about a common axis defined by the two hinge pins 34.

The two remote edges of the lids 14 and 16 are integrally formed to provide two identical handles 38a and 38b which lie atop each other when the pails 10 and 12 are closed as shown in FIG. 1 to provide a single carrying handle 38. The handle 38a is also provided with an integral latch 40 which can be flexed to embrace the other handle 38b as the pails 10 and 12 are closed in order to retain them in that state. Within the bail of each handle 38a and 38b are integrally formed tabs 42 and 44 which removably engage pintles 46 (only one being shown) on the adjacent end walls of the pails 10 and 12 in order to retain the lids 14 and 16 closed on their respective pails 10 and 12 when the latter are unfolded. Finally, the respective side walls of the pails 10 and 12 are provided with integrally formed pairs of anchors 48 and 50 (only those on one side being shown) for carrying handles when the pails 10 and 12 are individually used. The anchors 48 and 50 comprise hollow, box-shaped moldings closed at their sides and tops but open at their bottoms, their outer walls being provided with inverted slots 48a and 50a opening therethrough part way up from their bottom edges. The slots 48a and 50a receive the heads 52a and 54a at the outer ends of shanks 52b and 54b of fittings 52 and 54 secured at the ends of two lengths of cord 56, one being shown in FIG. 4.

When folded up as shown in FIG. 1, various fishing gear can be carried in the pails 10 and 12 by the handle 38. In this state the double pail can also serve as a seat or even as an emergency life preserver inasmuch as it will float awhile. When used for cleaning fish, the latch 40 is flexed aside and the pails 10 and 12 opened to the position shown in FIG. 2, whereupon the lids 14 and 16 provide work surfaces. The retaining collar 20 can be removed and a plastic bag or sheet, as indicated at 58 in FIG. 2, can be placed down in the opening 18 and secured by the collar 20 into which the entrails can be dumped. By releasing the tabs 42 and 44, which hold the lids 14 and 16 closed when the pails 10 and 12 are opened to prevent spilling their contents, access can be had to their interiors. When the pails 10 and 12 are unfolded the retaining ears 26c and 28c can be pushed aside to release the hinge leaves 26 and 28 so that they will slide from their anchors 22 and 24 upon a pull on the pails 10 and 12, whereupon the lids 14 and 16 together with the two hinge assemblies can be removed as a unit, thus freeing the pails 10 and 12 for individual use, such as for carrying water. For the latter purpose the fittings 52 and 54 of the cords 56 (which are normally carried within the pails 10 and 12) are engaged with the slotted anchors 48 and 50 to provide carrying handles. In short, the present invention provides a double pail having a wide variety of uses, functions and conveniences for fishermen.

Though the present invention has been described in terms of a particular embodiment, being the best mode known of carrying out the invention, it is not limited to that embodiment alone. Instead, the following claims are to be read as encompassing all adaptations and modifications of the invention falling within its spirit and scope.

I claim:

1. A fishermen's pail comprising: a pair of container portions and a pair of lid portions, the lid portions being associated with respective ones of the container portions to close over the same; the lid portions being hinged to their respective container portions for movement between open and closed positions relative thereto, one of the lid portions being provided with an aperture therein and means for retaining flexible bag forming material about said aperture and in the container portion associated with said one lid portion, the container portions being hinged to each other for movement between an open position in which the lid portions form adjacent work surfaces and a closed position in which one of the container portions is inverted upon the other with the lid portions in stacked position therebetween, each container portion having a base portion opposite its respective lid portion effective when both container portions are in their open position to engage and support said container portion in a stable position upon an underlying surface with its respective lid portion forming said work surface.

2. The pail of claim 1 in which the container and lid portions are hinged relative to each other about a common axis along adjacent edges of each.

3. The pail of claim 2 wherein the container portions are separable from each other for individual use.

4. The pail of claim 3 including hinge means hinging said container and lid portions as aforesaid, the hinge means and lid portions being removable together as a unit from each container portion, whereupon the container portions are separable from each other as aforesaid.

5. The pail of claim 4 including means retaining the container portions in their closed position.

6. The pail of claim 5 including means retaining each lid portion in its closed position relative to its associated one of the container portions.

7. The pail of claim 6 including removable handle means for carrying at least one of the container portions in a containing position when separated as aforesaid.

* * * * *